July 30, 1957  E. A. HEPPNER  2,801,356
FOCUS DEVICE
Filed Jan. 23, 1956
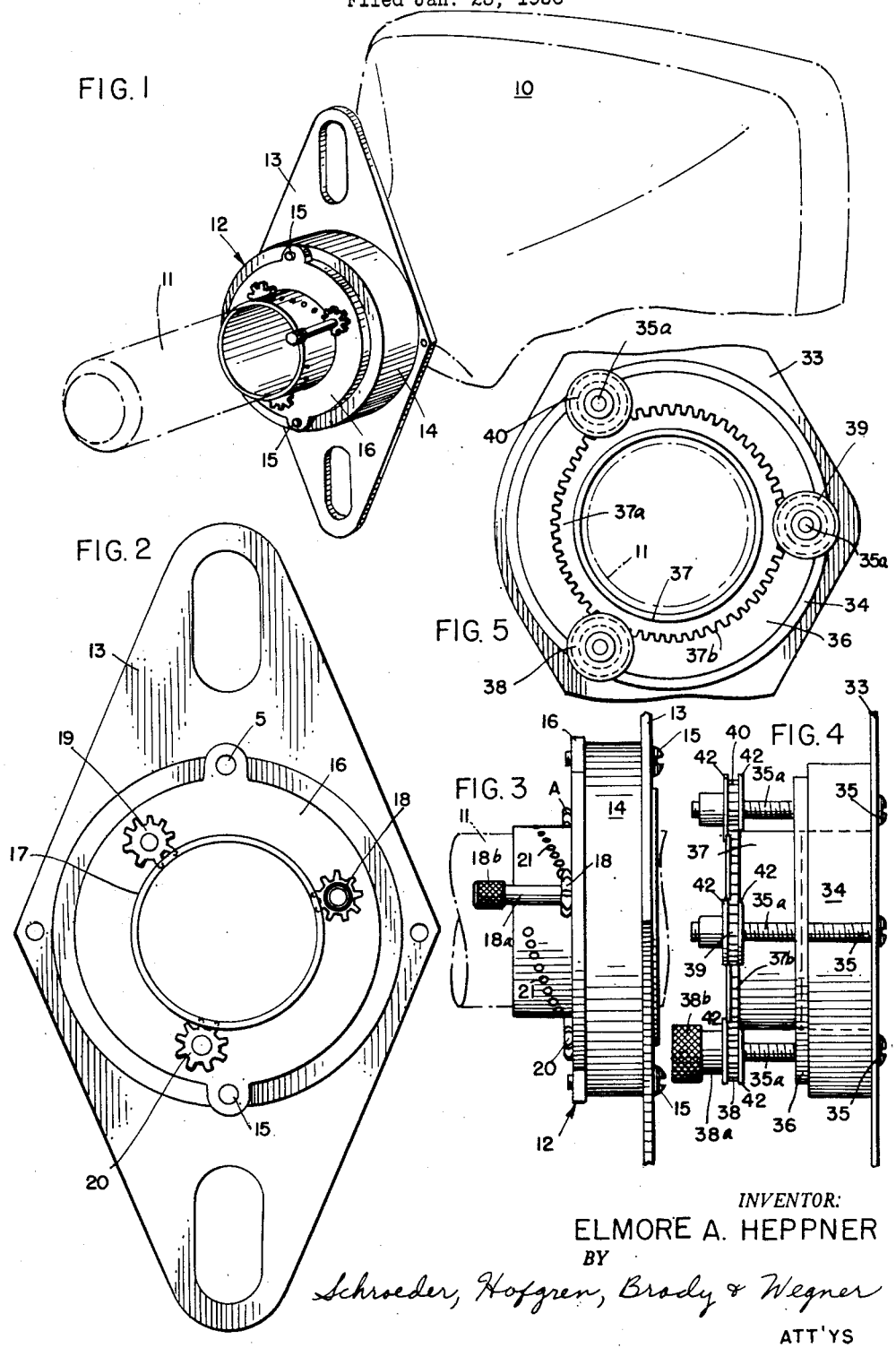
INVENTOR:
ELMORE A. HEPPNER
BY
Schroeder, Hofgren, Brady & Wegner
ATT'YS

United States Patent Office 2,801,356
Patented July 30, 1957

2,801,356
FOCUS DEVICE

Elmore A. Heppner, Round Lake, Ill., assignor to Heppner Manufacturing Co., a corporation of Illinois Application January 23, 1956, Serial No. 560,741

2 Claims. (Cl. 313—84)

This invention is concerned with a focus device for a cathode-ray tube and more particularly with a mounting arrangement for the shunt of a permanent magnet focus control.

The electron beam of a cathode-ray tube must be properly focused to provide a clear, sharp image on the viewing screen. One means for accomplishing this, which is widely used in television receivers, comprises an annular magnet which encircles the neck of the cathode-ray tube so that the field created by the magnet passes through the neck and affects the electron beam. In order to achieve the desired focus a shunt, as a sleeve of ferromagnetic material, is moved longitudinally along the tube neck within the magnet to vary the strength of the field. In the past, the outer surface of the shunt sleeve has been provided with threads which engage a complementary thread on a plate which is secured to the magnet. However, the shunt sleeves have a diameter of the order of an inch and a half or more and it is a relatively expensive operation to provide a suitable thread which permits the shunt to be adjusted easily, yet holds the shunt securely to prevent undesired changes in position.

I have devised and disclose and claim herewith a novel mounting arrangement for the shunt sleeve of a focus device which is relatively inexpensive to manufacture, easy to adjust and which maintains its adjusted position well.

One feature of the invention is that means are provided for supporting the shunt sleeve at a plurality of spaced points therearound, permitting rotation of the sleeve and including means for rotating the sleeve and for engaging the sleeve whereby rotation thereof effects longitudinal movement of the sleeve with respect to the magnet. Another feature is that one of the support members is a toothed pinion engaged with the sleeve whereby rotation of the pinion causes rotation and longitudinal movement of the sleeve.

A further feature is that a plurality of mounting studs extend outwardly from the magnet, one of the studs being threaded, and a plurality of sleeve support members are mounted on the studs and include a pinion threaded on the threaded stud and in engagement with the sleeve, whereby rotation of the pinion causes longitudinal movement of the sleeve.

Other and further features of the present invention will be readily apparent from the following description and drawings, in which:

Figure 1 is a perspective view of a cathode-ray tube with a focus assembly embodying the invention in place;

Figure 2 is a rear elevation of the focus assembly of Figure 1;

Figure 3 is a side elevation of the focus assembly of Figure 1;

Figure 4 is a side elevation of a modified form of the focus assembly; and

Figure 5 is a rear elevation of the focus assembly of Figure 4.

While this invention is susceptible of embodiments in many different forms, there is shown in the drawings and will herein be described in detail several embodiments with the understanding that the present disclosure is to be considered as an exemplification of the principles of the invention and is not intended to limit the invention to the embodiments illustrated. The scope of the invention will be pointed out in the appended claims.

Turning now to the drawings, the cathode-ray tube 10 shown in Figure 1 has a cylindrical neck portion 11 about which the focus assembly, indicated generally as 12, is positioned. The focus assembly includes a bracket 13 which may be mounted on the chassis of the apparatus. An annular magnet 14 of suitable characteristics is secured to bracket 13 by a pair of bolts 15 which extend through openings provided in the magnet and are threaded into a mounting plate 16. The focus adjustment sleeve 17 extends into the space between the magnet and the neck of the tube shunting a portion of the magnetic field created by the magnet around the tube neck and controlling the focusing effect of the magnet on the electron beam.

As best shown in Figures 2 and 3, three pinions 18, 19 and 20 are rotatably secured to mounting plate 16 with the teeth thereof extending into a series of generally helically arranged openings 21 provided in the sleeve. Pinion 18 is provided with an operating shaft 18a having a manually engageable knurled knob 18b formed at the end thereof. Rotation of pinion 18, by means of knob 18b, causes rotation and longitudinal movement of the shunt sleeve 17 with respect to the magnet 14. The pitch of the openings 21 may of course be designed to provide a desired degree of accuracy of the shunt control. It should be noted that the surfaces of the teeth of the pinions are tapered so that they have a camming effect on engagement with the openings in the sleeve facilitating operation of the device.

Turning now to Figures 4 and 5, showing a modified form of the shunt position control apparatus, reference numerals twenty higher than those previously used will be employed to indicate like parts. Magnet 34 is secured to bracket 33 by three bolts 35 which extend through the magnet and are threaded into a plate 36 to hold the magnet. The bolts 35 each have a threaded stud portion 35a which projects beyond the plate 36 and longitudinally of the magnet.

The shunt sleeve 37 has an outwardly extending flange 37a at the rear end thereof, the outer periphery of which is toothed to form a gear 37b. Three pinions 38, 39 and 40 are provided, each being threaded on one of the studs 35a and engaging ring gear 37b. Pinion 38 is provided with an operating shaft 38a having a knurled knob 38b at the end thereof, rotation of pinion 38 causing rotation of shunt sleeve 37 and thus of pinions 39 and 40. Each of the pinions, as they rotate, run back and forth on the threaded studs 35a carrying the shunt sleeve 37 with them to effect the desired focus adjustment. The pinions are each provided with collar portions 42 which extend on either side of flange 37a to keep the teeth of the pinions and of the gear 37b properly meshed.

I claim:

1. In a focus device for a cathode-ray tube including an annular magnet adapted to encircle the neck of the tube, adjusting means for said focus device, comprising a sleeve of magnetic material within said magnet and adapted to encircle the neck of the tube, a mounting plate carried by said magnet, and at least three toothed pinions rotatably carried on said mounting plate and each engaging complementary helically arranged openings in said sleeve, at least one of said pinions being manually rotatable to effect rotation and longitudinal movement of the sleeve with respect to the magnet.

2. Apparatus of the character described in claim 1, wherein the surfaces of the teeth of said pinion which engage the openings in the sleeve are tapered to provide a camming action facilitating the longitudinal movement of the sleeve.

References Cited in the file of this patent

UNITED STATES PATENTS

| | | |
|---|---|---|
| 2,416,687 | Fry | Mar. 4, 1947 |
| 2,418,487 | Sproul | Apr. 8, 1947 |
| 2,580,606 | Schiel | Jan. 1, 1952 |